United States Patent [19]

Gertz

[11] 4,174,945
[45] Nov. 20, 1979

[54] CORRUGATED PANEL AND APPARATUS FOR MANUFACTURING THE SAME

[76] Inventor: David C. Gertz, 6 N. 139 Weber Dr., St. Charles, Ill. 60174

[21] Appl. No.: 910,272

[22] Filed: May 30, 1978

Related U.S. Application Data

[62] Division of Ser. No. 776,519, Mar. 11, 1977, abandoned.

[51] Int. Cl.² .............................................. B29C 27/12
[52] U.S. Cl. ................................... 425/501; 425/504; 156/543; 425/388
[58] Field of Search .............. 425/388, 501, 504, 502, 425/505, 396; 156/543, 501

[56] References Cited

U.S. PATENT DOCUMENTS

| 3,775,932 | 12/1973 | Jeney | 424/388 X |
|---|---|---|---|
| 3,837,973 | 9/1974 | Asakura et al. | 425/388 X |
| 3,932,248 | 1/1976 | Keaton | 425/388 X |
| 3,999,928 | 12/1976 | Asakura et al. | 425/388 |

FOREIGN PATENT DOCUMENTS

| 872878 | 6/1971 | Canada | 425/388 |
|---|---|---|---|
| 50-3785 | 2/1975 | Japan | 425/388 |

*Primary Examiner*—Robert L. Spicer, Jr.
*Attorney, Agent, or Firm*—Wegner, Stellman, McCord, Wiles & Wood

[57] ABSTRACT

A solar panel comprising first and second generally parallel, spaced sheets of plastic material and a corrugated sheet of plastic material sandwiched between and bonded to the first and second sheets, the spacing between adjacent corrugations in the corrugated sheet being considerably less than 50% of the distance between the first and second sheets and no greater than about ½ inch, the plastic material being light transmitting and characterized by resistance to ultraviolet deterioration.

6 Claims, 5 Drawing Figures

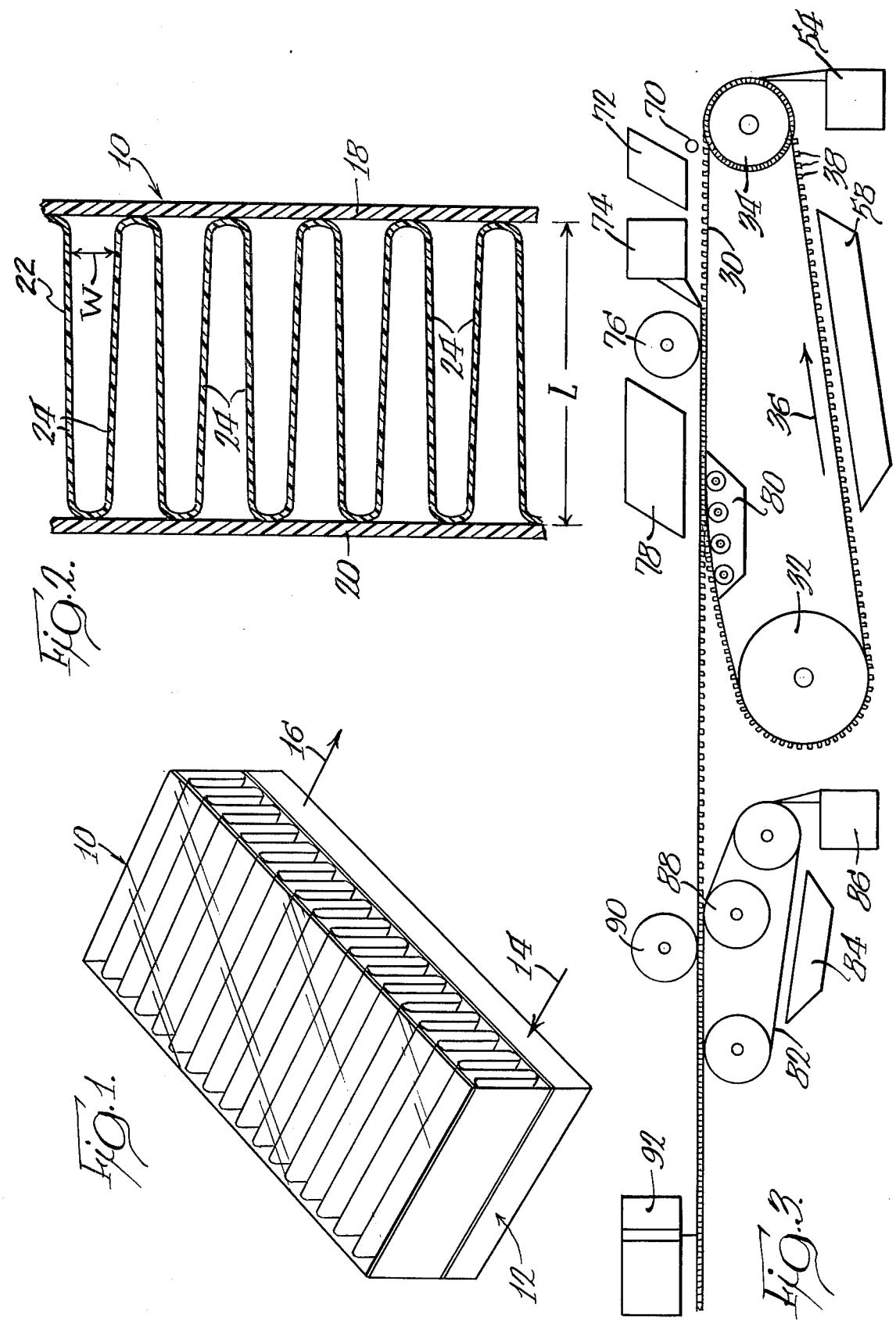

CORRUGATED PANEL AND APPARATUS FOR MANUFACTURING THE SAME

This is a division, of application Ser. No. 776,519 filed Mar. 11, 1977 now abandoned.

BACKGROUND OF THE INVENTION

This invention relates to solar panels and apparatus for manufacturing the same.

Ever-increasing concern for the development of new sources of energy has led to a considerable re-examination of the possibility of utilizing solar energy for heating purposes. Typically, the various proposals made for this purpose utilize solar panels backed by a heat absorbing medium through which a fluid may be circulated to convey heat absorbed from solar energy passing through the solar panel to a point of use.

In general, it is desired that the solar panel act as check valves for solar energy, allowing its passage to the heat absorbing mediums while precluding the flow of energy from the heat absorbing medium through the solar cells. Many of the solar cell constructions heretofore proposed are quite inefficient in so acting. A great deal of the energy entering the solar cell is either not conducted to the heat absorbing medium or, if conducted to the heat absorbing medium, is lost through convection, conduction and radiation. Such cells, therefore, are unsuitable for extensive use and, where usable at all, are limited to placement in areas having relatively mild climates.

Other, more efficient cell constructions have been proposed and, on a pilot basis, have operated quite satisfactorily. Such cells typically reduce losses due to convection to an absolute minimum and minimize radiation losses due to the emittance of infrared radiation from the absorbing medium. Materials with which such cells are formed typically are poor conductors, with the result that the conduction losses are also minimized.

However, the use of such cells has not, to date, proven economically feasible on a large scale basis due to the fact that exacting manufacturing procedures are required to construct such cells in a way to minimize convection, reradiation, and reflection losses.

SUMMARY OF THE INVENTION

It is a principal object of the invention to provide a new and improved solar cell which minimizes energy loss due to convection and reradiation and yet is inexpensive to manufacture.

It is also an object of the invention to provide a new and improved apparatus for manufacturing such solar cells and other like panels.

An exemplary embodiment of a solar panel or cell made according to the invention is formed of first and second, generally parallel, spaced sheets of plastic material. A corrugated sheet of plastic material is sandwiched between and bonded to the first and second sheets. The spacing between adjacent corrugations in the corrugated sheet is considerably less than 50% of the distance between the first and second sheets and no greater than about $\frac{1}{2}$ inch to preclude the existence of substantial convection currents and to minimize radiation and reflection losses. The plastic material is light-transmitting and is characterized by resistance to ultraviolet deterioration.

In a preferred embodiment, the spacing between adjacent corrugations is no greater than about $\frac{3}{8}$ inch and the distance between the first and second sheets is at least about six times the spacing between adjacent corrugations.

In a highly preferred embodiment, the sides of the corrugations are generally parallel and transverse to the sheets. Preferably, the plastic material is selected from the group consisting of glass, thermoplastic plastics and thermosetting resins.

According to the invention, there is also provided a vacuum-forming apparatus for producing a corrugated sheet which may be used in such a panel and which includes a continuous conveyor belt. A pair of spaced rotary elements, at least one of which is adapted to be driven, are rotatable about parallel axes and the belt is trained about the rotary elements with one side in contact therewith for movement in a closed path about the elements. The closed path has arcuate segments at the rotary elements and a plurality of flutes extend across the belt and are carried thereby in substantially equally spaced relation. The flutes project away from the belt on a side thereof opposite from the rotary elements to define a plurality of pockets, each having a bottom defined by the belt. At least one vacuum passage opens to the bottom of each pocket and to the side of the belt abutted by the rotary elements. A vacuum manifold is associated with one of the rotary elements and that rotary element further includes a vacuum distributor establishing fluid communication between the vacuum manifold and the belt for at least part of the arcuate segment of the path at that rotary element. Means are provided for directing a sheet of plastic material in a plastic state to the flutes at the one rotary element at or prior to the associated arcuate segment of the path, the sheet being drawn by the vacuum into the pockets to form a corrugated sheet.

According to a preferred embodiment, the flutes and the pockets have complementary cross-sectional shapes and opposed sides of each flute are substantially parallel. There is provided at least one additional vacuum passage in each flute which opens to the side of the belt remote from the flute so that it may be placed in fluid communication with the vacuum distributor.

A highly preferred embodiment of the invention also contemplates the provision of sealing plates flanking the belt and the ends of the flutes at the rotary element provided with the vacuum distributor. Spring means urge the plates into sealing engagement with the belt at the flute ends to seal the ends of the pockets. Air nozzles are located just downstream of each of the sealing plates for directing air under pressure towards the adjacent ends of the pockets.

When used to provide solar panels made according to the invention, the invention contemplates that the sheet director include a first extruder and that the apparatus further include a preheater upstream of the first extruder and adjacent the closed path for heating the belt and the flutes. A first cooling device is located downstream of the rotary element having the vacuum distributor and adjacent the path for cooling the corrugated plastic sheet within the pockets. A second sheet extruder is located adjacent the path and downstream of the first cooling means for extruding a second sheet of plastic material in a plastic condition onto the corrugated sheet. Pressure applying means are located adjacent the path and downstream of the second extruder for bonding the second sheet to the corrugated sheet in substantially planar form. Second cooling means are provided downstream of the pressure applying means and adjacent the path for cooling the second sheet and there is provided a fluid pressurized manifold downstream of the second cooling means for directing fluid under pressure to the vacuum passages to drive the corrugated sheet and the second sheet from the pockets. The first and second cooling means, the second extruder, the pressure applying means, and the pressurized manifold are all upstream of the rotary element not provided with the vacuum distributor and there are further provided means for applying and bonding a third, generally planar sheet of plastic material to the corrugated sheet oppositely of the second sheet along with means for cutting the sheets to form individual panels.

Other objects and advantages will become apparent from the following specification taken in connection with the accompanying drawings.

DESCRIPTION OF THE DRAWINGS

FIG. 1 is a somewhat schematic, perspective view of a solar panel made according to the invention in connection with a heat exchanger;

FIG. 2 is an enlarged, fragmentary, sectional view of the solar panel;

FIG. 3 is a somewhat schematic, elevational view of an apparatus made according to the invention for forming the solar panel of FIG. 2;

DESCRIPTION OF THE PREFERRED EMBODIMENTS

Figure 4:
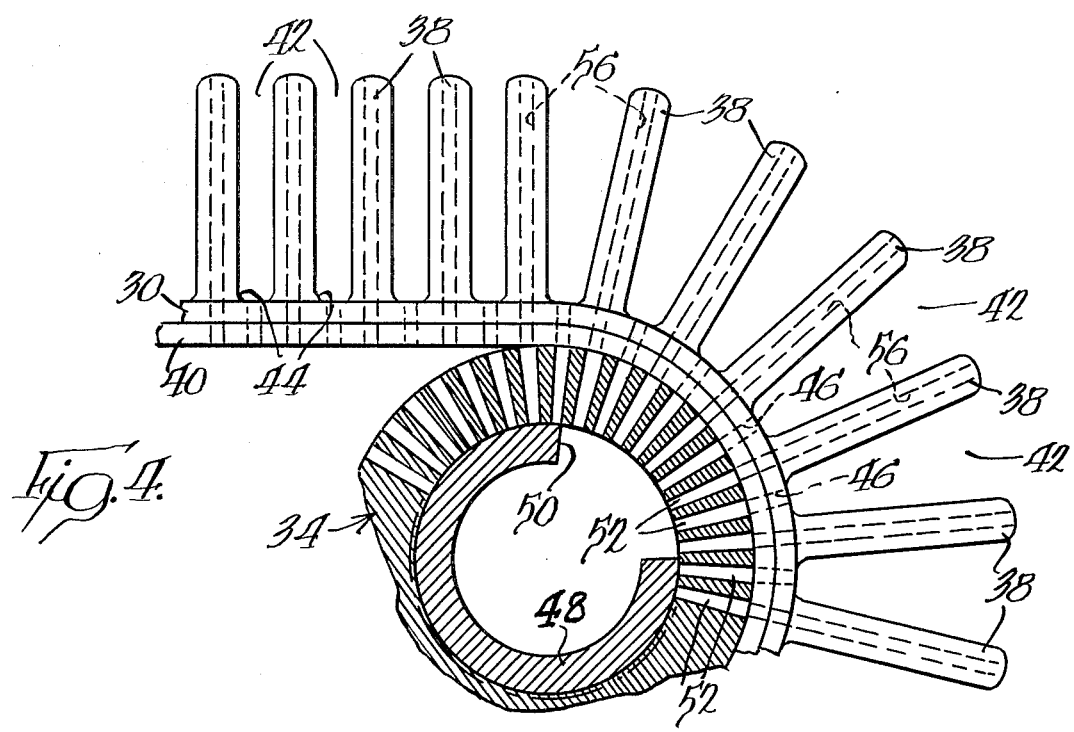
FIG. 4 is an enlarged, fragmentary sectional view of the vacuum-forming section of the apparatus.

An exemplary embodiment of a solar collector utilizing a solar panel made according to the invention is illustrated in FIG. 1 and is seen to include a solar panel, generally designated 10, made according to the invention, having a construction to be described in greater detail hereinafter, and a heat exchanger, generally designated 12, abutting one side of the panel 10. The exchanger 12 is adapted to absorb solar energy passing through the panel 10 and typically, a fluid will be introduced into the exchanger 12, as schematically represented by an arrow 14, to be heated by the energy absorbed therein. The fluid exits the exchanger 12 as schematically indicated by an arrow 16 to be conveyed to a point of use.

The panel 10 is illustrated in cross-section in FIG. 2 and is seen to be formed of generally parallel, spaced apart, planar sheets 18 and 20 formed of a plastic material. Interposed between the sheets 18 and 20 is a corrugated sheet 22 also formed of a plastic material and which is bonded to the sheets 18 and 20 by any suitable means, but preferably, in a manner to be described in greater detail hereinafter.

The sheets 18, 20 and 22 are formed of a plastic material such as glass, thermoplastic plastics, or thermoplastic resins which are light-transmitting. A highly preferred characteristics of the plastic is a resistance to ultraviolet deterioration to provide long life of the panel.

When the panel 10 is utilized in connection with a solar collector including a heat exchanger such as the heat exchanger 12, one or the other of the sheets 18 and 20 will be placed in abutment with the heat receiving surface of the exchanger 12. However, the panel 10 may be utilized as a solar energy collector without a heat exchanger, such as the exchanger 12, for, for example, the heating of swimming pools. In such a case, through any suitable means, which may include separate floats, or simply buoyancy provided by hermetically sealing the panel 10, one or more of the panels 10 are disposed on the water in the swimming pool to float thereon. Solar energy passing through the cell 10 will be absorbed by the underlying water in the pool to raise the temperature of the same. When it is desired to utilize the pool, it is only necessary to remove the panels to fully expose the surface of the pool.

As seen in FIG. 2, the corrugated sheet 22 is preferably formed such that the sides 24 of the corrugations are generally parallel. As actually illustrated, there is a slight divergence between adjacent sides 24 for the purpose of facilitating release of the corrugated sheet 22 from a forming apparatus, as will appear, but it is desired that parallelism be approached as nearly as possible.

As also seen in FIG. 2, the average spacing between adjacent sides 24 of the corrugations, designated W, is considerably less than 50% of the distance L between the sheets 18 and 20 and, according to the invention, is no greater than about ½ inch. Preferably, the spacing W is no greater than ⅜ inch and the spacing L between the panels 18 and 20 is at least six times the spacing W so that the individual cells in the panel have a length to width ratio of at least 6:1 and possibly as high as 12:1.

The orientation of the sides 24 of the corrugated sheet 22 tends to encourage reflection of rays not striking the panel normal to the sheet 18 or 20 to reflect toward the opposite sheet 18 or 20 which will be in abutment with the heat exchanger 12 or other energy absorbing medium to considerably reduce reflection losses. At the same time, the length to width ratio of the cells of at least 6:1 coupled with the maximum width of the cells precludes any substantial generation of convection currents within the cells themselves, thereby virtually eliminating loss due to convection. At the same time, use of materials such as those mentioned above results in the components of the panel 10 having a relatively low thermal conductivity so that conduction losses are also minimized. Preferably, the material of which the panel is formed is light transmitting in the visible spectrum only and is opaque to infrared light. Thus, energy in the infrared range reradiated from the absorbing medium will be almost wholly absorbed by the panel itself, further minimizing energy loss and maximizing panel efficiency. And, as will be seen, the panel 10 may be inexpensively fabricated through the use of the apparatus illustrated in FIGS. 3–5.

Figure 5:
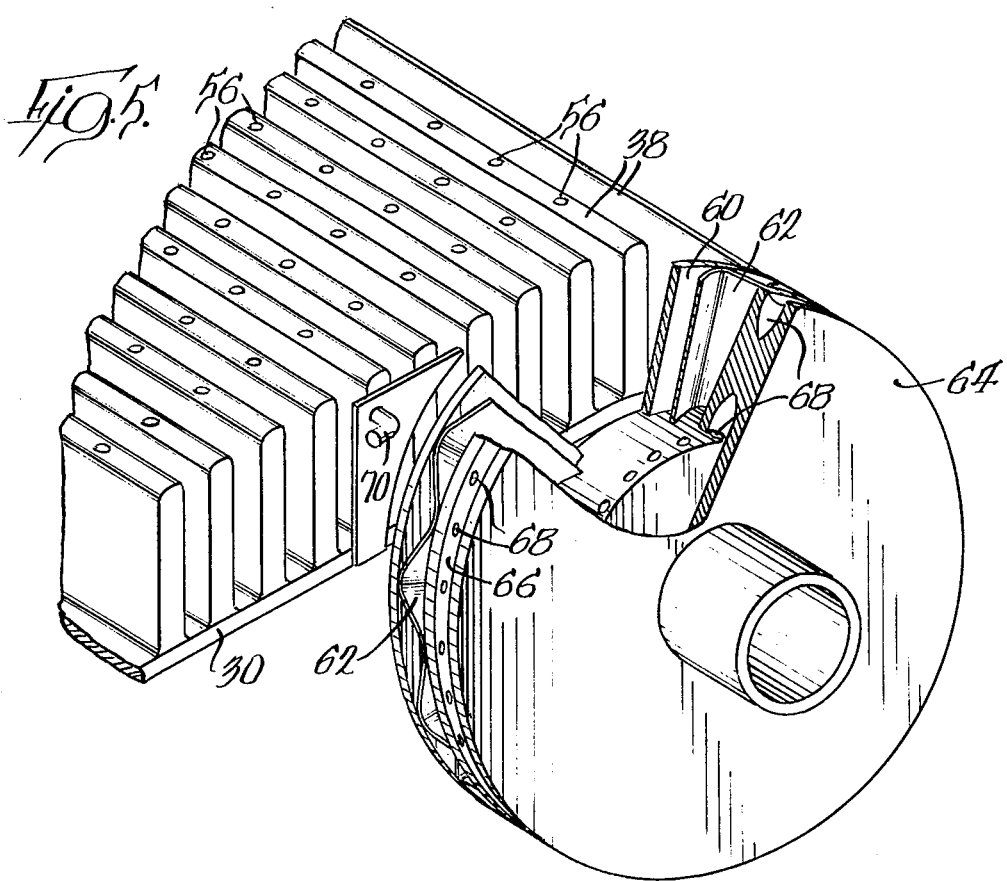
FIG. 5 is a fragmentary, perspective view of the vacuum-forming section of the apparatus.

An apparatus for forming a corrugated sheet having relatively high length to width ratios, as mentioned above, is illustrated in FIGS. 3–5 and is seen to include a continuous belt 30 which is trained about two spaced, rotary drums 32 and 34 which are rotatable about parallel axes. One or the other, or both, of the drums 32 and 34 may be driven to advance the belt 30 in the direction of an arrow 36. The belt 30 may either be formed of a flexible material or jointed metal and includes a plurality of upstanding flutes 38 extending from one side thereof. The side of the belt so opposite the flutes 38 and adjacent the drums 32 and 34 is provided with an elastomeric layer 40 to seal against a vacuum distributor as will be seen. The flutes 38 may or may not be integral with the belt but extend across the width of the belt 30 in equally spaced relation. As seen in FIG. 4, adjacent flutes 38 define pockets 42 having bottoms 44 defined by the belt 30 and when the belt 30 has assumed a straight line configuration, the cross-sections of the pockets 42 will be complementary to the cross-sectional shapes of the flutes 38, as seen in FIG. 4.

It will be observed that opposite sides of each flute 38 are generally parallel although some divergence from their free tips to the belt 30 may be desirable for reasons to appear hereinafter.

It will be appreciated that the belt 30 moves in a closed path about the rollers 32 and 34 and that the closed path has arcuate sections where the belt 30 is trained about the drums 32 and 34. Consequently, and as seen in FIG. 4, that section of the belt traveling in the arcuate segment of the closed path will have the associated flutes 38 spread adjacent their free ends.

Each of the pockets 42 is provided with a plurality of vacuum passages 46 which extend through the belt 30 and the layer 40 to the side of the latter in contact with the roller 34. As seen in FIG. 4, the axis of rotation of the roller 34 may be defined by a pipe-like, generally circular in section, vacuum manifold 48. An elongated segment of the manifold 48 is removed to form a slot 50 which opens toward part of the arcuate segment of the closed path of the belt 30 as it is trained about the roller 34. The roller 34 includes a plurality of radially extending, axially elongated slots 52 which open at their radially inner extremity to the slot 50 in the vacuum manifold 48 and at their radially outer extremity, to the underside of the layer 40. Hence a vacuum may be applied to the interior of each of the pockets 42 in the arcuate segment of the path of the belt 30 about the roller 34 when the passages 52 of the roller 34 are aligned with the slot 50.

Returning to FIG. 3, a conventional sheet extruder 54 for extruding a sheet of plastic in a plastic condition directs such a sheet to the flutes 38 at about, or just prior to, the time that fluid communication between the vacuum manifold 48 and the pockets 42 is established by the vacuum distributor represented by the passages 52 in the roller 34. This also occurs at a time when the outer extremity of the flutes 38 are spread, that is, when the belt 30 is moving in the arcuate segment of its path about the roller 34.

The vacuum in the pockets results in the plastic sheet, which, it will be recalled, is in a plastic condition, being drawn into the pockets to conform to the shape thereof. Continued movement of the flutes 38 will cause the same to close the pocket to bring the sides of the extruded sheet into parallelism substantially as illustrated in FIG. 2 since the sheet will be in a plastic condition during such movement.

To enhance the vacuum forming of the sheet extruded by the extruder 54, each of the flutes 38 is provided with a plurality of vacuum passages which are in fluid communication with the manifold 48 through the vacuum distributor over the same period that the vacuum passages 46 are in such fluid communication. Consequently, the sheet is held tightly to the ends of the flutes 38.

To ensure that the sheet will not set up prior to the pockets 42, assuming the configuration illustrated for straight line extension of the belt 30, a preheater 58, upstream of the sheet extruder 54 is provided adjacent the path for heating the belt and the flutes 38 to a desired temperature.

To seal the ends of the pockets 42, to preclude air from being drawn thereinto to defeat the vacuum forming of the sheet, at opposite ends of the roller 34, there is provided a sealing plate 60 which abuts the ends of the flutes to close the pocket at all times when the same are in fluid communication with the vacuum manifold 48. The plate 60 is shown somewhat schematically in FIG. 5 and is resiliently urged by a spring, shown schematically at 62, into the sealing engagement with the ends of the flutes 38 as well as the edges of the belt 30.

In some cases, it may be desirable to provide means for positively locating the edges of the sheet extruded by the sheet extruder 54 well outwardly of the ends of the flutes 38 to prevent the same from being drawn into the pockets 42 to result in ragged edges. To this end, outwardly of the plate 60 and spring 62, a plate 64 may be located. The plate 64 is cylindrical in nature and on its cylindrical surface includes a peripheral groove 66. Radially extending passages 68 extend to the grooves 66 and to the slot 50 in the vacuum manifold 48. Preferably, though not illustrated herein, lands may extend across the groove 66 between each of the passages 68 to preclude fluid communication between adjacent ones of the passages 68 except when connected in common to the vacuum manifold 48 by the slot 50.

As a consequence, the edges of the sheet will be grasped, by vacuum, and held in place against the plate 64. Means of any desired configuration and known in the art may be utilized to allow fluid communication to the atmosphere of those passages 68 not in the fluid communication with the vacuum manifold 48 to allow release of the edges of the sheet after the vacuum forming operation has taken place.

Just downstream of the sealing plates 60, and on opposite sides of the conveyor, pressurized air nozzles 70 may be located to direct air under pressure against the sides of the corrugated sheet to blow them inwardly of the ends of the flutes 38 to prevent their snagging on other portions of the equipment. This is due to the fact that such end walls will not be planar in nature due to the partial collapse of the pockets 42 as the belt 30 moves from an arcuate segment of its path to a linear segment of its path.

Returning to FIG. 3, just downstream of the roller 34, and at a location whereat the belt 30 is traveling in a linear portion of the path, there is provided a cooling device, such as a fan schematically illustrated at 72, for directing cooling air against the corrugated sheet so that the same may solidify. Just downstream of the cooler 72 is a second sheet extruder 74 which extrudes, for example, the sheet 18, onto the corrugated sheet 22. A pressure laminating means 76, such as a pressure roller causes the sheet extruded by the extruder 74 to be bonded to the corrugated sheet. Preferably, the sheet extruded by the extruder 74 is extruded in a plastic state and pressure applied by the pressure laminating means 76 before the same has fully set up to ensure a good bond.

Downstream of the pressure laminating means 76 is a second cooler 78 which directs cooling air against the sheet applied by the extruder 74 to cool the same while it is in a substantially planar condition.

Downstream of the second cooling means 78 and on the opposite side of the belt 30 is a pressure manifold 80. A fluid under pressure, such as air, is directed to the interior of the manifold and such pressurized air is directed to the bottoms 44 of the pockets 42 through the vacuum passages 46 and 56 to expel the corrugated sheet and the sheet applied thereto by the extruder 74 from the pockets 42. If the sides of the pockets are slightly tapered, as mentioned previously, the release operation is somewhat simplified and to further enhance release, if desired, guides for the belt 30 may cause the same to move in a slightly arcuate path in the area of the pressure manifold 80 to slightly open the pockets to break any adherence of the sheets to the sides of the pockets without crushing the pockets.

After the sheets have been freed from the pockets, they are directed to a transfer conveyor 82 which applies the other of the sheets 18 and 20 to the corrugated sheet 22. The transfer conveyor 82 may be of conventional construction and is preheated by a preheater 84 prior to the application of the third sheet by a conventional sheet extruder 86 to the transfer conveyor. A roller 88 brings the transfer conveyor into abutment with the underside of the partially completed cell structure and, in combination with a pressure laminating means 90 in the form of a roller, causes the same to be bonded to the corrugated sheet 22 oppositely of the first sheet applied thereto.

Thereafter, the resulting assemblage may be optionally cooled and is fed to a conventional cutter 92 which cuts the sheets into panels of a desired size. Typically, the cutter 92 will cut the panels transversely, that is, parallel to the length of the corrugating and may include trimming means to trim the edges thereof. This will, of course, leave the ends of the panel open, but they may be suitably closed by the application of plastic sheets thereto, or the application of boundaries, such as wood panels, or formed in situ foam panels.

From the foregoing, it will be appreciated that a solar panel made according to the invention possesses significant advantages in terms of minimizing and/or eliminating losses due to radiation and convection as well as conduction. In some cases, one or the other of the sheets 18 and 20 may be omitted and the corresponding side of the corrugated sheet placed directly in intimate contact with a heat absorbing medium. And, in addition to use as a solar panel or collector, the panel may be used in architectural glazing applications or wherever light transmitting panels having excellent insulation characteristics are required. It will also be appreciated that the panels may be easily formed relatively inexpensively through use of the apparatus of the present invention.

With respect to the apparatus, those skilled in the art will appreciate that the unique construction, particularly that including means whereby the pockets 42 are opened during the vacuum forming portion of the formation of the corrugated sheet allows the attainment of corrugated panels having far greater length to width ratios than that obtainable on presently known vacuum forming equipment, thereby allowing the inexpensive fabrication of highly efficient solar panels.

I claim:

1. Vacuum forming apparatus for producing a corrugated sheet, comprising:
 a continuous conveyor belt;
 a pair of spaced rotary elements, at least one of which is adapted to be driven, and rotatable about parallel axes, said belt being trained about said rotary elements with one side in contact therewith for movement in a closed path about said elements, said closed path having arcuate segments at said rotary elements;
 a plurality of flutes extending across said belt and carried thereby in substantially equally spaced relation and projecting away from said belt on the side thereof opposite said one side to define a plurality of pockets each having a bottom defined by said belt;
 at least one vacuum passage opening to the bottom of each said pocket and to said belt one side;
 a vacuum manifold associated with one of said rotary elements;
 said one rotary element further including a vacuum distributor establishing fluid communication between said vacuum manifold and said belt one side for at least part of the arcuate segment of said path at said one rotary element; and
 means for directing a sheet of plastic material in a plastic state to said flutes at said one rotary element at or prior to the associated arcuate segment of said path.

2. The vacuum forming apparatus of claim 1 wherein said flutes and said pockets have complementary cross-sectional shapes, and opposed sides of each flutes are substantially parallel; and further including at least one additional vacuum in each flute passage opening to said belt one side and the remote extremity of the flute.

3. The vacuum forming apparatus of claim 1 further including sealing plates flanking said belt and the ends of said flutes at said one rotary element; spring means urging said plates into sealing engagement with said belt and said flute ends to seal the ends of said pockets at said one rotary element; and air nozzles just downstream of each said sealing plate for directing air under pressure toward the adjacent ends of the pockets.

4. A panel forming apparatus including the vacuum forming apparatus of claim 6 wherein said sheet director comprises a first extruder and further including a preheater upstream of said first extruder and adjacent said path for heating said belt and said flutes, first cooling means downstream of said one rotary element and adjacent said path for cooling a corrugated plastic sheet within said pockets; a second sheet extruder adjacent said path and downstream of said first cooling means for extruding a second sheet of plastic material in a plastic condition onto said corrugated sheet; pressure applying means adjacent said path and downstream of said second extruder for bonding the second sheet extruded by said second extruder in substantially planar form to said corrugated sheet; second cooling means downstream of said pressure applying means and adjacent said path for cooling said second sheet; a fluid pressurized manifold downstream of said second cooling means and on said belt one side for directing fluid under pressure to said vacuum passages to drive said corrugated second sheets from said pockets; said first and second cooling means, said second extruder, said pressure applying means and said pressurized manifold all being upstream of said other rotary element; means for applying and bonding a third generally planar sheet of plastic material to said corrugated sheet oppositely of said second sheet; and means for cutting said sheets to form individual panels.

5. The vacuum forming apparatus of claim 1 wherein the height of each flute is greater than the spacing between individual flutes and wherein said flutes are elongated and generally parallel across said belt.

6. The vacuum forming apparatus of claim 5 wherein the height of each flute is several times the spacing between adjacent flutes.

* * * * *